United States Patent [19]
Antonio et al.

[11] Patent Number: 5,917,812
[45] Date of Patent: *Jun. 29, 1999

[54] SYSTEM AND METHOD FOR REDUCING INTERFERENCE GENERATED BY A DIGITAL COMMUNICATION DEVICE

[75] Inventors: Franklin P. Antonio, Del Mar, Calif.; Klein S. Gilhousen, Bozeman, Mont.

[73] Assignee: Qualcomm Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/632,875

[22] Filed: Apr. 16, 1996

[51] Int. Cl.$^6$ .................................................. H04J 3/00
[52] U.S. Cl. ............................. 370/337; 455/501; 455/63
[58] Field of Search ...................................... 370/310, 317, 370/318, 319, 321, 322, 326, 329, 330, 336, 337, 343, 344, 345, 347, 348; 455/33.1, 34.1, 49.1, 50.1, 52.1, 52.3, 53.1, 54.1, 63, 422, 517, 64, 65, 501, 502, 503

[56] References Cited

U.S. PATENT DOCUMENTS

| | | | |
|---|---|---|---|
| 5,210,771 | 5/1993 | Schaeffer et al. | 375/202 |
| 5,291,475 | 3/1994 | Bruckert | 370/330 |
| 5,361,258 | 11/1994 | Arnold et al. | 370/330 |
| 5,430,761 | 7/1995 | Bruckert et al. | 375/200 |
| 5,475,677 | 12/1995 | Arnold et al. | 370/280 |
| 5,570,352 | 10/1996 | Poyhonen | 370/330 |
| 5,579,306 | 11/1996 | Dent | 370/330 |
| 5,581,548 | 12/1996 | Ugland et al. | 370/330 |

FOREIGN PATENT DOCUMENTS

| | | | |
|---|---|---|---|
| 0632609 | 4/1995 | European Pat. Off. | H04B 15/00 |
| 0765042 | 3/1997 | European Pat. Off. | H04B 1/04 |
| 2238449 | 5/1991 | United Kingdom | H04J 3/00 |

OTHER PUBLICATIONS

"Brummen im Ohr–GSM–Handys und Horgerate", Funkschau, vol. 67, No. 25, Nov. 24, 1995, pp. 60–61.

*Primary Examiner*—Chi H. Pham
*Assistant Examiner*—Kwang B. Yao
*Attorney, Agent, or Firm*—Russell B. Miller; Bruce W. Greenhaus; Tom Streeter

[57] ABSTRACT

A system and method for reducing radio frequency interference arising in connection with pulsed transmission over time division multiplexed communication channels. In a first embodiment, a subscriber station is nominally assigned all of the slots of each frame of a first transmit channel. By transmitting RF energy substantially continuously, the subscriber station reduces interference arising from pulsed transmission. In a second embodiment, a subscriber station is nominally assigned one or more slots of each frame of a primary channel for conventional transmission of useful information, and is also instructed to continuously transmit RF energy over an auxiliary channel at times other than during the assigned primary channel slots. In this way, interference generated in the vicinity of the subscriber station is reduced due to the substantially continuous transmission of RF energy by the subscriber station. More than one subscriber station may simultaneously utilize the auxiliary channel during reduced interference mode operation.

56 Claims, 4 Drawing Sheets

SYSTEM AND METHOD FOR REDUCING INTERFERENCE GENERATED BY A DIGITAL COMMUNICATION DEVICE

BACKGROUND OF THE INVENTION

I. Field of the Invention

The present invention relates generally to wireless communications systems. More particularly, the present invention is directed to a novel system and method for reducing interference generated by digital communications devices.

II. Description of the Related Art

In time-division multiple access (TDMA) cellular communication systems which are well known in the art, the available frequency spectrum is subdivided into a predetermined number of radio frequency channels, each of a given bandwidth. Each radio frequency channel is time-divided into a cycle of TDMA frames and each frame is further time-divided into a cycle of a predetermined number of time intervals, called "slots." Thus, one slot represents a finite time period on a predetermined radio frequency channel. Communication over the radio interface occurs during these slots in groups of modulated bits, called "bursts," with one burst per slot. A "normal burst" contains a packet of bits of useful information which is preceded and followed by a brief "guard period" during which no useful information is nominally transmitted. This guard period allows for power ramping of the transmitter as it turns on prior to transmission of the information bits and turns off after transmission of the information bits.

Although the word "channel" as used above corresponds to a particular fixed radio frequency bandwidth, it should be noted that in the more general case, i.e. in a frequency agile system such as the TDMA based Global System for Mobile Communications (GSM) system, a "channel" may also have a temporal component. That is to say that a "channel" which is dedicated to a single function (i.e. a traffic channel), would be a succession of slots which may occupy different frequencies at different times. It is in this more general, functional sense that the word "channel" will be used below.

When a given subscriber station in the communication system enters a dedicated mode, such as during a call set-up or when performing location updating to the base station, it is typically assigned to a particular slot of a transmit channel for transmission of its information, which has been packaged into a sequence of normal bursts. Thus, although many subscriber stations in a given cell may transmit over a single channel (limited at least by the number of slots in a frame), the individual normal bursts from each user are time-division multiplexed into their corresponding slots. For example, a subscriber station assigned to the first slot in a frame of a given transmit channel will nominally transmit only during the first slot of each frame, and otherwise remains with its transmitter turned off so as to avoid interfering with the burst transmissions of the subscriber stations respectively assigned to the remainder of the slots of that transmit channel frame. Thus, the subscriber station assigned to the first slot will turn on its transmitter during the guard period at the beginning of the first slot, transmit a package of useful information bits during that first slot, turn off its transmitter during the guard period at the end of the first slot, and remain with its transmitter turned off during all other slots of the frame. Likewise, the subscriber station assigned to the second slot of the frame will turn on its transmitter during the guard period at the beginning of the second slot, transmit a package useful information bits during that second slot, turn off its transmitter during the guard period at the end of the second slot, and remain with its transmitter turned off during all other slots of the frame.

This periodic on/off switching of the subscriber station's transmitter produces a transmitted signal which is especially capable of interfering with the operation of nearby electronic equipment. Because this on/off switching modulates the amplitude of the RF energy transmitted, we will refer to interference which is caused by such on/off switching as "amplitude modulation interference", or simply "AM interference." For example, in the pan-European GSM cellular system, each frame has a duration of 4.615 ms, and is divided into eight slots, with each slot being 577 $\mu$s in duration. Transmission during the same slot of each frame results in a subscriber station burst repetition rate of 216.6 Hz (i.e., 1/4.615 ms). Since this burst repetition rate is within the audio frequency range, it may be undesirable in the presence of other electronic equipment which contains circuitry which may act as an AM detector. For example, if a GSM subscriber station is operated in the vicinity of a stereo system, the burst repetition rate may be heard as a buzz emanating from the speakers.

It should be noted that other TDMA-based digital communication systems use different frame lengths and a different number of slots per frame. For example, the U.S. TDMA cellular communication system described in Telecommunications Industry Association (TIA)/Electronic Industries Association (EIA) Interim Standard 54-B (IS-54-B) uses cyclical TDMA frame lengths of 20 ms, each subdivided into six slots. Also, it should be noted that for higher-bandwidth signals, the TDMA system may assign more than one slot per frame to a single subscriber station in order to accommodate the higher rate signal. However, these systems still use a burst repetition rate in the audio frequency range which may produce substantial interference in surrounding electronic equipment.

Many electronic devices, such as hearing aids and cardiac pacemakers, are also susceptible to interference from such pulsed transmissions. In particular, hearing aids have been found to be sensitive AM detectors, and are designed to provide considerable audio gain. As such, significant interference may be incurred when hearing aids are operated in the vicinity of GSM and other TDMA-type user communication devices. In fact, the level of audio interference or "buzz" in the hearing aid wearer's ear may be enough to drown out the sound of the caller's voice, precluding effective use of a TDMA subscriber station by the hearing aid wearer.

Accordingly, it is an object of the present invention to provide a transmission scheme for a multiple access communication system which minimizes the potential for AM interference with surrounding electronic devices.

SUMMARY OF THE INVENTION

The present invention is directed to a system and method for reducing the undesirable AM interference arising in connection with periodic transmissions in digital wireless communication systems. The invention finds particular application in a time-division multiple access communication system, such as GSM.

In a first embodiment of the present invention, a first subscriber station operating in a reduced interference mode is nominally assigned all of the slots of each frame of a first transmit channel. By transmitting RF energy substantially continuously, even throughout the guard periods of each slot, the subscriber station substantially eliminates the AM interference arising from pulsed transmission. A second subscriber station may be similarly disposed to operate in the reduced interference mode of the first embodiment. In particular, the second subscriber station is nominally assigned all of the slots of each frame of a second transmit channel.

In a second embodiment of the present invention the first subscriber station is nominally assigned one or more slots of each frame of the first transmit channel, which shall be referred to as the "primary" channel, for conventional transmission of useful information. However, in contrast to the prior art, the first subscriber station is also instructed to continuously transmit RF energy over an "auxiliary" channel at times other than during the assigned primary channel slots. The first subscriber station does not turn off its transmitter while re-tuning to the auxiliary channel frequency or back to the primary channel frequency. In this way the level of AM interference generated in the vicinity of the first subscriber station is reduced due to the substantially continuous transmission of RF energy by the first subscriber station, even throughout the guard periods of each slot. A second subscriber station may be similarly disposed to operate in the reduced interference mode of the second embodiment. In particular, the second subscriber station may be nominally assigned one or more slots of each frame of the primary channel for conventional transmission of useful information, and is also instructed to continuously transmit RF energy over the auxiliary channel at times other than during the assigned primary channel slots. Likewise, the second subscriber station does not turn off its transmitter while re-tuning to the auxiliary channel frequency or back to the primary channel frequency.

As can be seen in the second embodiment, more than one subscriber station may simultaneously utilize the auxiliary channel during reduced interference mode operation. If many such subscriber stations are simultaneously operating in the reduced interference mode, it is immediately clear that the auxiliary channel will be flooded with interfering transmissions. For this reason, the auxiliary channel is chosen such that these "junk" transmissions do not interfere with the information being transmitted on the other channels.

It should be noted that the present invention contemplates transmission of RF energy by the subscriber station in each slot of a frame only while the subscriber station is still in a dedicated mode (i.e. while a call is in progress, or when performing location updating), and not when the mobile station is otherwise in an idle mode (i.e. merely monitoring control channels for broadcast information). However, this limitation in not strictly required for the reduction of AM interference.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
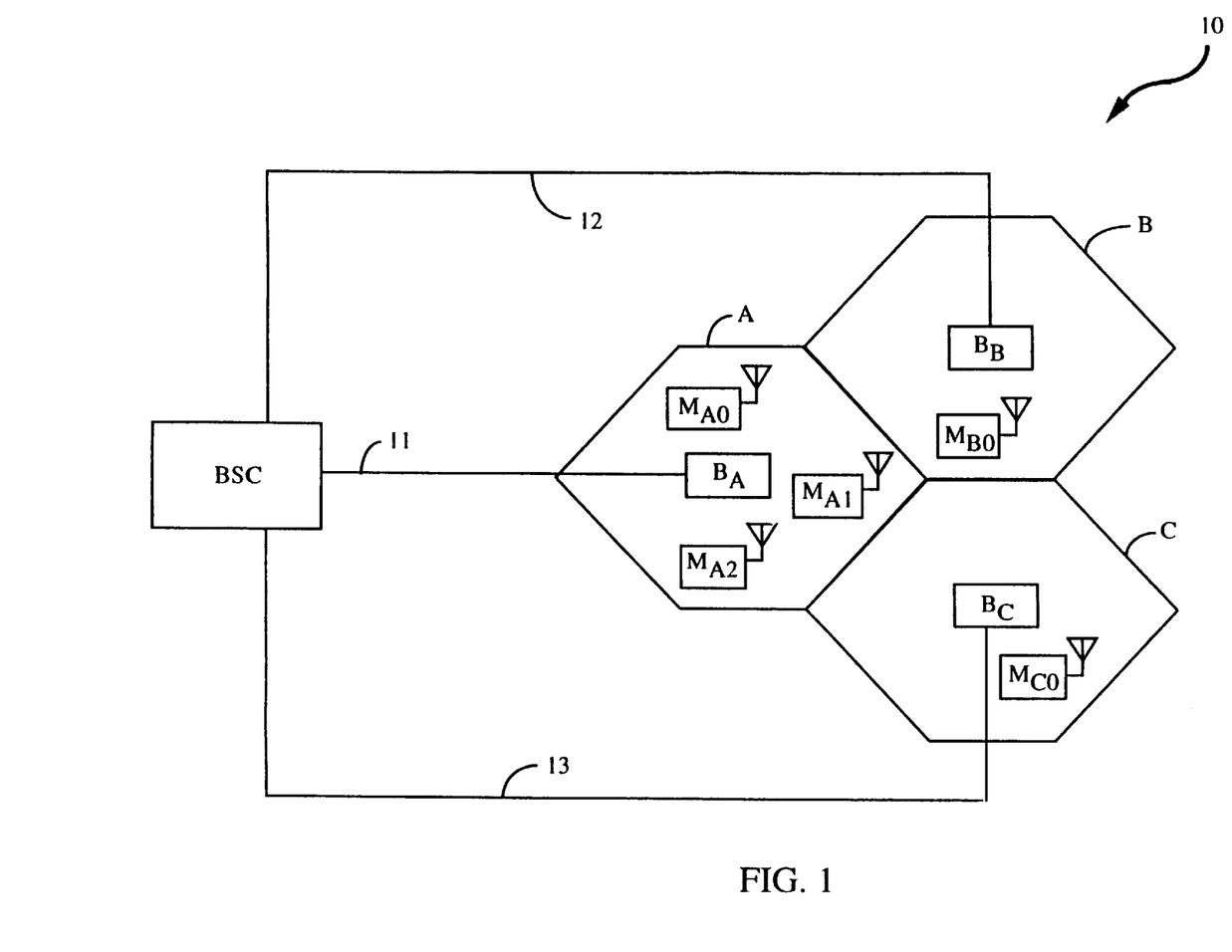
FIG. 1 provides an illustration of three cells, respectively identified as A, B and C, of an exemplary cellular mobile radio system.

FIG. 1 provides an illustration of three cells, respectively identified as A, B and C, of an exemplary cellular mobile radio system 10. For each cell A, B and C there is respectively associated a base station $B_A$, $B_B$, and $B_C$. For illustrative purposes, base station $B_A$ is shown to be in communication with three subscriber stations, $M_{A0}$, $M_{A1}$, and $M_{A2}$, each disposed within a cell boundary of base station $B_A$. Base station $B_B$ is shown to be in communication with one subscriber station, $M_{B0}$, disposed within a cell boundary of base station $B_B$. Similarly, base station $B_C$ is shown to be in communication with one subscriber station, $M_{C0}$, disposed within a cell boundary of base station $B_C$. Also depicted in FIG. 1 is a base station controller (BSC). The BSC of FIG. 1 is connected to all three base stations $B_A$, $B_B$ and $B_C$ by cables 11–13. In addition, the BSC is connected by cables (not shown) to a mobile switching center (MSC) which serves as an access point to the public switched telephone network (PSTN) or the equivalent. It should be noted that the present invention is applicable to non-cellular TDMA communication systems as well, such as PCS or wireless local loop systems. As such, the subscriber stations may be any type of remote communication device, either fixed, mobile, or portable. However, for purposes of explanation it will be sufficient to make reference to the cellular system of the three cells A, B, and C, with mobile units configured for cellular operation.

Figure 2:
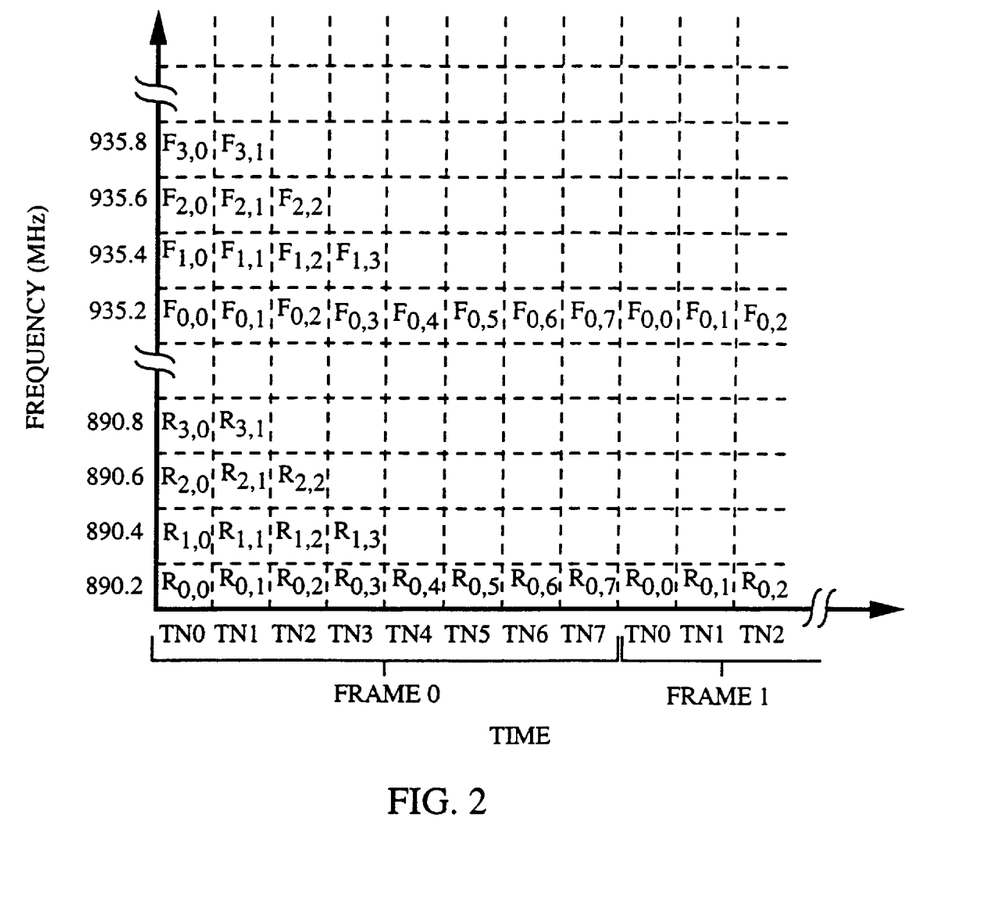
FIG. 2 provides an illustration of an exemplary TDMA time/frequency allocation scheme for the cellular radio system of FIG. 1.

The cellular radio system 10 of FIG. 1 is designed to accommodate communication over a plurality of radio frequencies. An exemplary TDMA time/frequency allocation scheme for one of the base stations, $B_A$, $B_B$, or $B_C$, is shown in FIG. 2. In FIG. 2, four reverse link (mobile to base station) carrier frequencies, R, and four forward link (base station to mobile) carrier frequencies, F, are illustrated, each with a 200 Khz carrier spacing. The reverse link carrier frequencies are 890.2–890.8 Mhz, whereas the forward link carrier frequencies are 935.2–935.8 Mhz, respectively. Along the time axis, the cycle of TDMA frames is represented by FRAME 0 and FRAME 1, wherein each time interval of duration 577 μs is further defined by its time interval number (TN), from TN0 to TN7. The cycle of slots on the reverse link defined by the carrier frequency 890.2 Mhz and the time intervals TN0–TN7 are labeled as $R_{0,0}$ to $R_{0,7}$, respectively. Likewise, the cycle of slots on the forward link defined by the carrier frequency 935.2 Mhz and the time intervals TN0–TN7 are labeled as $F_{0,0}$, to $F_{0,7}$, respectively. It should be noted that although the exemplary TDMA time/frequency allocation of FIG. 2 closely resembles that of a GSM system, its teachings are applicable to other TDMA systems with more or fewer slots per frame, and a different carrier frequency spacing. For example, the U.S. TDMA system described in TIA/EIA/IS-54-B uses six slots per TDMA frame, and a 30 Khz carrier frequency spacing.

In the prior art TDMA systems, a given mobile unit, for example $M_{A0}$ (see FIG. 1), transmits normal bursts of information to its corresponding base station, $B_A$, in one or more assigned slots of each frame of a reverse link channel. For example, in a TDMA system wherein reverse link channels are fixed in frequency, mobile unit $M_{A0}$ may be assigned to transmit normal bursts in each slot indexed $R_{0,0}$ when $M_{A0}$ is in a dedicated mode. Similarly, a second mobile unit, $M_{A1}$, in communication with base station $B_A$ may be assigned to transmit normal bursts in each slot indexed $R_{0,1}$ when $M_{A1}$ is in a dedicated mode. A third mobile unit, $M_{A2}$, may be assigned to transmit normal bursts in slots associated with a different carrier frequency, such as each slot indexed $R_{1,0}$. Correlatively, $M_{A0}$ would be assigned to receive bursts transmitted by base station $B_A$ in each forward channel slot indexed $F_{0,0}$. Likewise, $M_{A1}$ would be assigned to receive bursts transmitted by base station $B_A$ in each forward channel slot indexed $F_{0,1}$, and $M_{A2}$ would be assigned to receive bursts transmitted by base station $B_A$ on a separate carrier frequency, in each forward channel slot indexed $F_{1,0}$.

In the more general case of a frequency-agile TDMA system such as GSM, mobile unit $M_{A0}$ would still transmit normal bursts of information to its corresponding base station, $B_A$, in one assigned slot of each frame of a reverse link channel. However, since the reverse link channel would not be fixed in frequency, $M_{A0}$ would be assigned to transmit normal bursts in each slot indexed $R_{H,0}$, where H corresponds to the hopping sequence number of the frequency hopping scheme of the particular reverse link channel. Thus, for an exemplary 4-frame cyclical hopping sequence of $\{0, 1, 2, 3\}$, $M_{A0}$ would transmit normal bursts in slot $R_{0,0}$ of FRAME 0, slot $R_{1,0}$ of FRAME 1, slot $R_{2,0}$ of FRAME 2, and slot $R_{3,0}$ of FRAME 3. Mobile unit $M_{A1}$ would similarly transmit normal bursts in slot $R_{0,1}$ of FRAME 0, slot $R_{1,1}$ of FRAME 1, slot $R_{2,1}$ of FRAME 2, and slot $R_{3,1}$ of FRAME 3. The reverse link channel being used by mobile unit $M_{A2}$ would have a different hopping sequence of, for example $\{1, 2, 3, 0\}$. In such a case, $M_{A2}$ would transmit normal bursts in slot $R_{1,0}$ of FRAME 0, slot $R_{2,0}$ of FRAME 1, slot $R_{3,0}$ of FRAME 2, and slot $R_{0,0}$ of FRAME 3.

In the conventional prior art TDMA system described above, mobile units $M_{A0}$, $M_{A1}$, and $M_{A2}$, would remain with their transmitters off during the brief guard periods of each assigned slot, and during all other time intervals TN0–TN7 of each frame in order to avoid interfering with traffic on other channels. As previously mentioned, it is this pulsed transmission of periodic bursts which gives rise to undesirable AM interference. In the present invention, such AM interference is eliminated by substantially continuous transmission of RF energy.

In a first embodiment of the present invention, one or more of the mobile units $M_{A0}$, $M_{A1}$, and $M_{A2}$ is configured, as described below, to operate in a reduced interference mode in which it is assigned to continuously transmit RF energy throughout each slot of each frame of a given reverse link channel. That is to say, it is assigned a dedicated channel for exclusive use during operation in reduced interference mode. For example, suppose $M_{A0}$ has been configured to operate in a reduced interference mode. In the fixed-frequency channel TDMA system described above, $M_{A0}$ is directed to transmit continuously in each slot $R_{0,0}$ to $R_{0,7}$ of each frame. In such a fixed-frequency channel system, neither $M_{A1}$ nor $M_{A2}$ would be able to effectively communicate with base station $B_A$ in slots indexed $R_{0,x}$ because of interference caused by simultaneous transmission on the same carrier frequency by $M_{A0}$. As such, all other mobile units in cell A would be restricted to transmitting in respective assigned slots of one of the remaining carrier frequencies, here 890.4 Mhz–890.8 Mhz.

If a second mobile unit, $M_{A1}$, were also assigned to operate in a reduced interference mode at the same time as $M_{A0}$, then $M_{A1}$ would be directed to transmit continuously in all slots of each frame of a separate carrier frequency than that of $M_{A0}$, for example, in each slot $R_{1,0}$ to $R_{1,7}$ of each frame. The remainder of the mobile units in cell A would thus be restricted to transmitting in respective assigned slots of one of the remaining carrier frequencies, here 890.6 Mhz–890.8 Mhz.

In a TDMA system having frequency-agile reverse link channels, the first embodiment of the present invention may be implemented in at least two ways. A first in which the dedicated channel is fixed in frequency while the rest of the channels remain frequency agile, and a second in which the dedicated channel is also frequency agile.

If the dedicated channel is fixed in frequency, each mobile unit operating in the reduced interference mode would be assigned a dedicated carrier frequency as in the fixed-frequency channel TDMA system just described, with all other mobile units in that cell continuing to frequency hop on a per-frame basis among the remainder of the carrier frequencies. In this first frequency-agile implementation, the hopping sequence for a given reverse link channel would be altered to eliminate hops to the dedicated carrier frequency of the mobile unit operating in reduced interference mode. For example, if reverse link carrier frequency $R_0$ (890.2 Mhz) were dedicated to mobile unit $M_{A0}$ operating in reduced interference mode and transmitting in each slot slots $R_{0,0}$–$R_{0,7}$ of each frame, then mobile units $M_{A1}$ and $M_{A2}$ could be assigned to reverse link channels having a 3-frame cyclical hopping sequence of, for example $\{1, 2, 3\}$, thus eliminating hops to frequency $R_0$ while it is dedicated to mobile unit $M_{A0}$.

If the dedicated channel is frequency-agile, each mobile unit operating in the reduced interference mode would transmit continuously in each slot of a given frame on an assigned frequency as before. However, the mobile unit operating in the reduced interference mode would continue to frequency hop on a per-frame basis along with the rest of the mobile units communicating in that cell. For example, mobile unit $M_{A0}$, operating in reduced interference mode, is assigned to transmit continuously in each slot of each frame of a given reverse link channel having a 4-frame cyclical hopping sequence of $\{0, 1, 2, 3\}$. $M_{A0}$ would transmit continuously in slots $R_{0,0}$–$R_{0,7}$ of FRAME 0, slots $R_{1,0}$–$R_{1,7}$ of FRAME 1, slots $R_{2,0}$–$R_{2,7}$ of FRAME 2, and slots $R_{3,0}$–$R_{3,7}$ of FRAME 3. This second frequency-agile implementation would eliminate the need to alter the hopping sequence for any of the channels. Thus, mobile units $M_{A1}$ and $M_{A2}$ could be assigned to reverse link channels having a 4-frame cyclical hopping sequence of, for example $\{1, 2, 3, 0\}$. It should be noted that if the dedicated channel is frequency-agile, the mobile unit would continue to transmit RF energy as it re-tuned its transmitter to the next frequency in the hopping sequence.

In all implementations of this first embodiment, the mobile unit is assigned an exclusive dedicated transmit channel while it is operating in reduced interference mode. However, in an implementation which retains the conventional, cyclical timing scheme of a TDMA system, only a subset of the slots of each frame of the dedicated channel need contain useful information. For instance, the mobile unit may transmit meaningful information during its assigned slots, and otherwise transmit an unmodulated carrier throughout the remainder of the slots of the dedicated channel. In such an implementation, the base station would only need to tune a receiver to the dedicated channel during the slots which contain useful information. Alternatively, the mobile unit may transmit repeated versions of the same information, one in each slot of the frame. In yet another example, the mobile unit may even transmit non-repeated useful information in each slot of each frame of the dedicated transmit channel. Note that in each of the above examples, the mobile unit operating in the reduced interference mode is continuously transmitting RF energy, even during the guard periods nominally surrounding each burst.

In a second embodiment of the present invention, one or more of the mobile units $M_{A0}$, $M_{A1}$, and $M_{A2}$ is configured to operate in a reduced interference mode in which it is directed to transmit meaningful information in one or more slots of each frame of a given reverse link channel. With respect to this "primary" channel, operation of the reduced interference mode mobile unit is similar to a conventional mobile unit of a prior art TDMA system. However, in contrast to the conventional prior art TDMA system, a mobile unit operating in a reduced interference mode of this second embodiment also transmits over an "auxiliary" channel throughout all time intervals TN0–TN7 which are not associated with slots it has been assigned on its primary channel. Additionally, in contrast to the first embodiment of the present invention in which each reduced interference mode mobile unit is assigned an exclusive, dedicated transmit channel on which to transmit, the auxiliary channel may be simultaneously shared by more than one reduced interference mode mobile unit.

For example, both $M_{A0}$ and $M_{A1}$ may be configured to operate in a reduced interference mode, and a fixed-frequency reverse link channel defined by all slots $R_{0,0}$–$R_{0,7}$ of each frame of carrier frequency $R_0$ may be reserved as the auxiliary channel. In this case, $M_{A0}$ and $M_{A1}$ may be assigned a primary channel resident among the slots of the remaining carrier frequencies. In a fixed-frequency channel TDMA system, for example, $M_{A0}$ may be assigned to transmit useful information in each slot indexed $R_{1,0}$ of each frame, and $M_{A1}$ may be assigned to transmit useful information in each slot indexed $R_{1,1}$ of each frame. In such a case, $M_{A0}$ would also re-tune its transmitter to continuously transmit in each slot indexed $R_{0,1}$–$R_{0,7}$ of the auxiliary channel. Likewise, $M_{A1}$ would also re-tune its transmitter to continuously transmit in each slot indexed $R_{0,0}$ and $R_{0,2}$–$R_{0,7}$ of the auxiliary channel. Note that both $M_{A0}$ and $M_{A1}$ are now simultaneously transmitting in each slot indexed $R_{0,2}$–$R_{0,7}$. Each mobile unit would continue to transmit RF energy as it re-tuned its transmitter to the auxiliary channel frequency or back to the primary channel frequency.

In a TDMA system having frequency-agile reverse link channels, the second embodiment of the present invention may be implemented in at least two ways, similarly to that of the first embodiment. Namely, a first in which the auxiliary channel is fixed in frequency while the rest of the channels remain frequency agile, and a second in which the auxiliary channel is also frequency agile.

If the auxiliary channel is fixed in frequency, a fixed-frequency reverse link channel defined by all slots $R_{0,0}$–$R_{0,7}$ of each frame of carrier frequency $R_0$ may be reserved as the auxiliary channel. Mobile unit $M_{A0}$, operating in a reduced interference mode, may be assigned to transmit on a primary channel defined by time interval TN0 and a 3-frame cyclical hopping sequence of $\{1, 2, 3\}$. Likewise, mobile unit $M_{A1}$, also operating in a reduced interference mode, may be assigned to transmit on a primary channel defined by time interval TN1 and a 3-frame cyclical hopping sequence of $\{1, 2, 3\}$. However, both $M_{A0}$ and $M_{A1}$ would continuously transmit on the auxiliary channel throughout all time intervals not associated with their respective primary channels. In detail, mobile unit $M_{A0}$ would continuously transmit in slot $R_{1,0}$ and slots $R_{0,1}$–$R_{0,7}$ of FRAME 0, slot $R_{2,0}$ and slots $R_{0,1}$–$R_{0,7}$ of FRAME 1, and slot $R_{3,0}$ and slots $R_{0,1}$–$R_{0,7}$ of FRAME 2. Likewise, mobile unit $M_{A1}$ would continuously transmit in slots $R_{0,0}$, $R_{1,1}$ and $R_{0,2}$–$R_{0,7}$ of FRAME 0, slots $R_{0,0}$, $R_{2,1}$ and $R_{0,2}$–$R_{0,7}$ of FRAME 1, and slots $R_{0,0}$, $R_{3,1}$ and $R_{0,2}$–$R_{0,7}$ of FRAME 2. Again, note that both $M_{A0}$ and $M_{A1}$ are now simultaneously transmitting in each slot indexed $R_{0,2}$–$R_{0,7}$.

In the case where the auxiliary channel is frequency-agile, it may be defined by all time intervals TN0–TN7 and the 4-frame cyclical hopping sequence of $\{0, 1, 2, 3\}$. Mobile unit $M_{A0}$, operating in a reduced interference mode, may be assigned to transmit on a primary channel defined by time interval TN0 and a 4-frame cyclical hopping sequence of $\{1, 2, 3, 0\}$. Likewise, unit $M_{A1}$, also operating in a reduced interference mode, may be assigned to transmit on a primary channel defined by time interval TN1 and a 4-frame cyclical hopping sequence of $\{1, 2, 3, 0\}$. In detail, mobile unit $M_{A0}$ would transmit in slot $R_{1,0}$ and slots $R_{0,1}$–$R_{0,7}$ of FRAME 0, slot $R_{2,0}$ and slots $R_{1,1}$–$R_{1,7}$ of FRAME 1, slot $R_{3,0}$ and slots $R_{2,1}$–$R_{2,7}$ of FRAME 2, and slot $R_{0,0}$ and slots $R_{3,1}$–$R_{3,7}$ of FRAME 3. Likewise, mobile unit $M_{A1}$ would transmit in slots $R_{0,0}$, $R_{1,1}$ and $R_{0,2}$–$R_{0,7}$ of FRAME 0, slots $R_{1,0}$, $R_{2,1}$ and $R_{1,2}$–$R_{1,7}$ of FRAME 1, slots $R_{2,0}$, $R_{3,1}$ and $R_{2,2}$–$R_{2,7}$ of FRAME 2, and slots $R_{3,0}$, $R_{0,1}$ and $R_{3,2}$–$R_{3,7}$ of FRAME 3. Again, note that both $M_{A0}$ and $M_{A1}$ are now simultaneously transmitting on the auxiliary channel throughout time intervals TN2–TN7. Again, the mobile unit would continue to transmit RF energy as it re-tuned its transmitter to the next frequency in the hopping sequence.

This second embodiment leads to more efficient use of the frequency spectrum because of the sharing of the auxiliary channel by multiple mobile units. However, it should be noted that even in the case where there is only one mobile unit which is operating in a reduced interference mode in a cell (i.e. the auxiliary channel is not yet being shared), the second embodiment differs from the first embodiment in an important aspect. Specifically, in the first embodiment, at least one slot of the dedicated channel contains useful information for appropriate demodulation by the base station. However, in the second embodiment, no slots of the auxiliary channel need contain useful information. As such, the base station need not tune a receiver to the auxiliary channel at any time. Thus, the auxiliary channel need not be resident among the carrier frequencies nominally assigned to that base station as reverse link traffic channels. In fact, one auxiliary channel may even be shared by several base stations.

The present invention is believed to be of particular benefit to hearing impaired users of digital communications devices. That is, since such users will often be reliant upon electronic hearing aids, the reduced interference levels associated with operation in accordance with the invention minimize the impact upon hearing aid operation. A variety of authorization schemes could be instituted as a means of ensuring that only those mobile units associated with selected eligible users (e.g., hearing impaired users) are permitted to engage in the type of reduced interference transmission contemplated by the invention. For example, only eligible hearing impaired users could be allowed to purchase mobile units (e.g., cellular phones) pre-authorized for operation in a reduced interference mode. Alternately, eligible hearing impaired users could obtain authorization from their cellular service provider after purchase of a mobile unit capable of reduced interference mode operation, and subsequently receive over-the-air activation of a reduced interference mode service option from a cellular service provider during call set-up.

Figure 3:
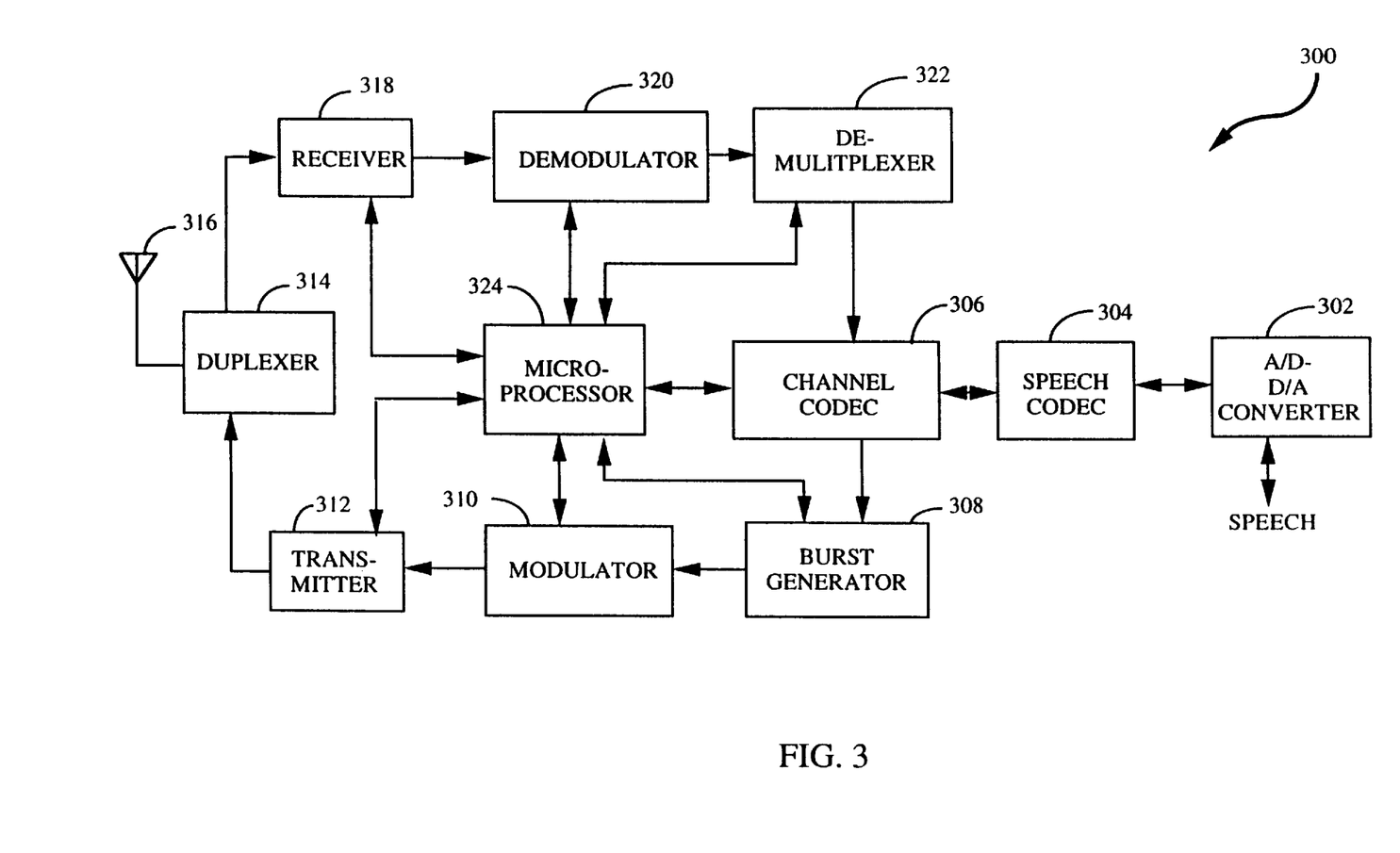
FIG. 3 is a block diagram subscriber station disposed for communication over digital communication channels in a reduced interference mode of operation.

FIG. 3 is a block diagram of a mobile unit 300 disposed for communication over digital communication channels in a reduced interference mode of the present invention. In mobile unit 300, speech is digitized by A/D-D/A converter 302 and encoded in speech codec 304 as is known in the art.

Channel codec 306 introduces redundancy into the data flow, increasing its rate by adding information calculated by the source data, in order to allow the detection and correction of signal errors introduced during transmission. In burst generator 308, the flow of coded words generated by channel codec 306 is multiplexed with signaling bits from microprocessor 324 as necessary, interleaved, and then formatted into separate bursts by adding training sequence bits and tail bits as necessary. Mobile unit 300 signals its intention to operate in a reduced interference mode to the base station by the use of signaling generated by microprocessor 324. The bursts generated by burst generator 308 are modulated onto an intermediate frequency by modulator 310. The resulting analog waveform is upconverted to a carrier frequency by transmitter 312, and routed to antenna 316 by duplexer 314, where it is radiated to the base station. When mobile unit 300 is operating in a reduced interference mode as described above, microprocessor 324 instructs transmitter 312 to continue to transmit RF energy, irrespective of whether meaningful information is being provided to modulator 310 by burst generator 308. In a system having frequency-agile reverse link channels, microprocessor 324 also instructs transmitter 312 to re-tune to the next frequency in the hopping sequence.

Signals received by antenna 316 are routed to receiver 318 by duplexer 314. Receiver 318 bandpass filters the signals captured by antenna 316, selecting the appropriate signal and downconverting it to an intermediate frequency. Demodulator 320 extracts the received bursts from the modulating frequency signal, and passes the resulting digital signal to demultiplexer 322. Demultiplexer 322 de-interleaves the demodulated signal, sorts the received information from the different slots and frames into their appropriate logical channels, and passes the reconstructed code words to channel codec 306. Channel codec 306 then reconstructs the source information from the code words generated by demultiplexer 322, using any added redundancy to detect and correct possible errors. Instructions for the mobile unit 300, assigning it to a primary channel and, in the second embodiment, an auxiliary channel, are provided to mobile unit 300 via signaling messages from the base station, and are passed to microprocessor 324 by channel codec 306. Coded digital speech is sent by channel codec 306 to speech codec 304 where it is decoded and converted to an analog speech waveform in converter 302 as is well known in the art.

Figure 4:
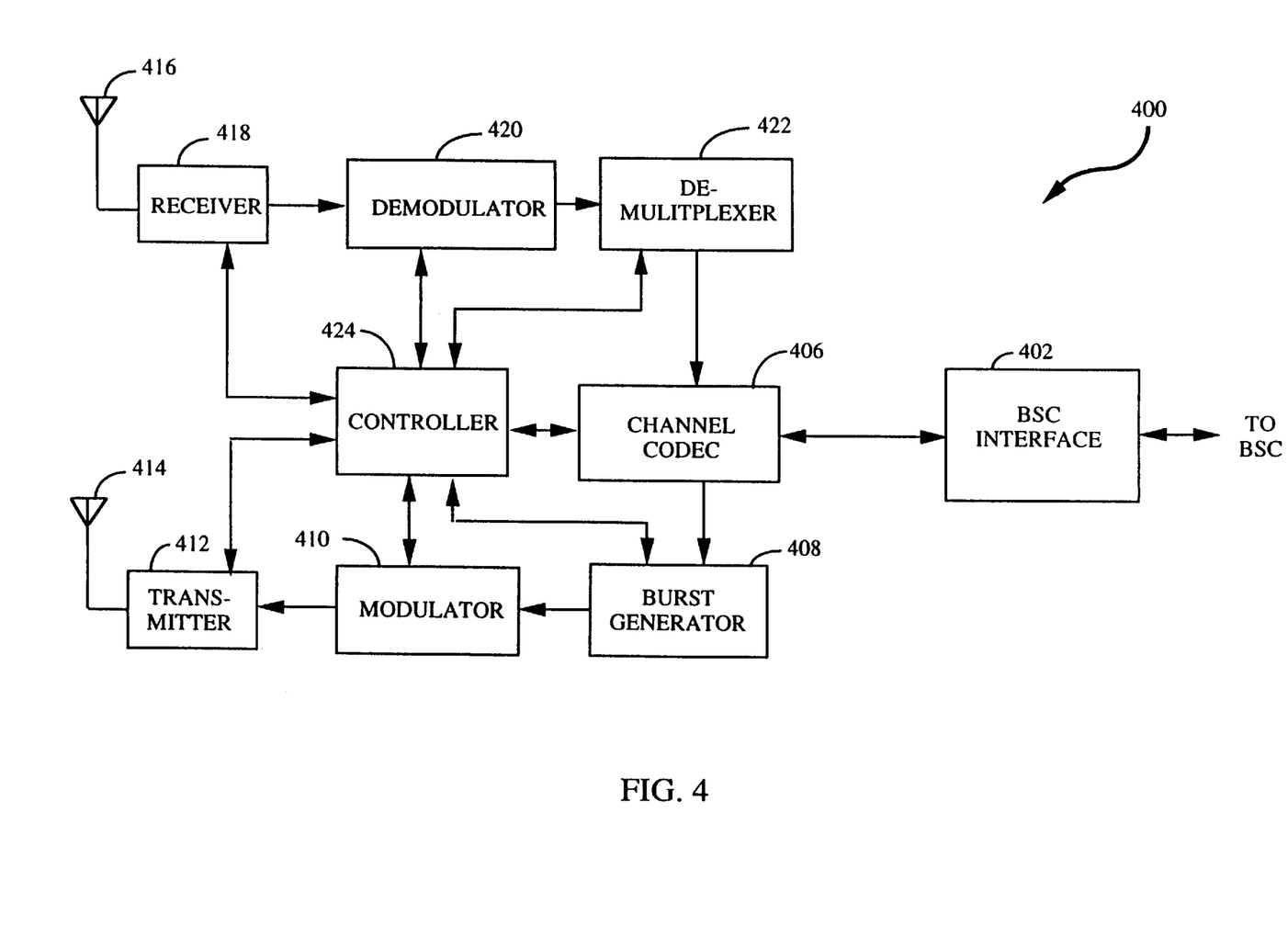
FIG. 4 illustrates a base station designed for operation in the cellular mobile radio system of FIG. 1.

FIG. 4 illustrates a base station 400 designed for operation in the cellular mobile radio system of FIG. 1, and capable of supporting mobile unit 1300 operating in a reduced interference mode. In many ways, the speech processing operations of base station 400 are similar to that of mobile station 300. Although a base station 400 may contain many transmitter 412 and receiver 418 resources, it will be sufficient to explain the operation of base station 400 with reference to a single transmitter 412 and single receiver 418. Receiver 418 contains the bandpass filters which select the desired carrier frequency from the all of the signals received by antenna 416. Receiver 418 also downconverts the desired signal to an intermediate frequency. Demodulator 420 extracts the bit stream from the downconverted signal and passes the resultant digital signal to demultiplexer 422. Demultiplexer 422 de-interleaves the demodulated signal, sorts the received information from the different slots and frames into their appropriate logical channels, and passes the reconstructed code words to channel codec 406. Channel codec 406 then reconstructs the source information from the code words generated by demultiplexer 422, using any added redundancy to detect and correct possible errors. Channel codec 406 also separates out any signaling intended for the base station 400 and passes it to controller 424.

The BSC interface 402 is the logical interface for both digitized speech and control messages between the BSC and base station 400. Many of the control messages are transparent to base station 400 and are simply passed on via channel codec 406. For example, when mobile unit 300 signals that it intends to operate in a reduced interference mode, this message is passed by base station 400 to the BSC where it may be further passed to a subscriber database for authentication. Any control messages from the BSC that are intended for the base station 400 itself are passed by channel codec 406 to controller 424. For example, based on cell loading conditions, the BSC may allow mobile unit 300 to operate in reduced interference mode, and may instruct base station 400 to direct mobile unit 300 to transmit on a particular dedicated channel (as in the first embodiment) or primary channel and auxiliary channel (as in the second embodiment). Messages intended for mobile unit 300 are passed to burst generator 408 where they are interleaved, multiplexed with signaling messages generated by controller 424 as necessary, and formatted into bursts. Modulator 410 modulates the bursts onto an intermediate frequency, and transmitter 412 upconverts and transmits the signal over antenna 414.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A system for reducing amplitude modulation interference in a time-division multiple access communication system having a plurality of communication devices which communicate with a base station and in which a plurality of communication channels are divided into a cycle of time intervals, said system comprising:

means for directing a first of said plurality of communication devices to transmit an information signal to said base station over a first of said plurality of communication channels continuously throughout a predetermined at least one of said time intervals and to transmit RF energy continuously throughout a remainder of said time intervals, wherein said RF energy comprises a non-message bearing signal; and means, in said first communication device and responsive to said means for directing, for transmitting said information signal to said base station over said first communication channel continuously throughout said predetermined at least one of said time intervals and for transmitting RF energy continuously throughout said remainder of said time intervals, whereby said interference is reduced proximate said first communication device due to continuous transmission thereby.

2. The system of claim 1 wherein said means for directing directs said first communication device to transmit RF energy over said first communication channel continuously throughout said remainder of said time intervals, and wherein said means for transmitting transmits RF energy over said first communication channel continuously throughout said remainder of said time intervals.

3. The system of claim 2 further comprising:

means for directing a second of said plurality of communication devices to transmit an information signal to said base station over a second of said plurality of communication channels continuously throughout a predetermined at least one of said time intervals and to transmit RF energy over said second communication channel continuously throughout a remainder of said time intervals; and means, in said second communication device and responsive to said means for directing, for transmitting said information signal to said base station over said second communication channel continuously throughout said predetermined at least one of said time intervals and for transmitting RF energy over said second communication channel continuously throughout said remainder of said time intervals, whereby said interference is reduced proximate said second communication device due to continuous transmission thereby.

4. The system of claim 1 wherein said means for directing directs said first communication device to transmit RF energy over a second of said communication channels continuously throughout said remainder of said time intervals and wherein said means for transmitting transmits RF energy over said second communication channel continuously throughout said remainder of said of said time intervals.

5. The system of claim 3 further comprising:

means for directing a second of said plurality of communication devices to transmit an information signal to said base station over one of said plurality of communication channels continuously throughout a predetermined at least one of said time intervals and to transmit RF energy over said second communication channel continuously throughout a remainder of said time intervals; and means, in said second communication device and responsive to said means for directing, for transmitting said information signal to said base station over said one of said communication channels continuously throughout said predetermined at least one of said time intervals and for transmitting RF energy over said second communication channel continuously throughout said remainder of said time intervals, whereby said interference is reduced proximate said second communication device due to continuous transmission thereby.

6. A method for reducing amplitude modulation interference in a time-division multiple access communication system having a plurality of communication devices which communicate with a base station and in which a plurality of communication channels are divided into a cycle of time intervals, said method comprising the steps of:

directing a first of said plurality of communication devices to transmit an information signal to said base station over a first of said plurality of communication channels continuously throughout a predetermined at least one of said time intervals and to transmit RF energy continuously throughout a remainder of said time intervals, wherein said RF energy comprises a non-message bearing signal; and transmitting, from said first communication device and in response to said directing step, said information signal to said base station over said first communication channel continuously throughout said predetermined at least one of said time intervals and RF energy continuously throughout said remainder of said time intervals, whereby said interference is reduced proximate said first communication device due to continuous transmission thereby.

7. The method of claim 6 wherein said directing step further comprises the step of directing said first communication device to transmit RF energy over said first communication channel continuously throughout said remainder of said time intervals, and wherein said transmitting step further comprises the step of transmitting RF energy over said first communication channel continuously throughout said remainder of said time intervals.

8. The method of claim 7 further comprising the steps of:

directing a second of said plurality of communication devices to transmit an information signal to said base station over a second of said plurality of communication channels continuously throughout a predetermined at least one of said time intervals and to transmit RF energy over said second communication channel continuously throughout a remainder of said time intervals; and transmitting, from said second communication device and in response to said directing step, said information signal to said base station over said second communication channel continuously throughout said predetermined at least one of said time intervals and RF energy over said second communication channel continuously throughout said remainder of said time intervals, whereby said interference is reduced proximate said second communication device due to continuous transmission thereby.

9. The method of claim 6 wherein said directing step further comprises the step of directing said first communication device to transmit RF energy over a second of said communication channels continuously throughout said remainder of said of said time intervals and wherein said transmitting step further comprises the step of transmitting RF energy over said second communication channel continuously throughout said remainder of said of said time intervals.

10. The method of claim 8 further comprising the steps of:

directing a second of said plurality of communication devices to transmit an information signal to said base station over one of said plurality of communication channels continuously throughout a predetermined at least one of said time intervals and to transmit RF energy over said second communication channel continuously throughout a remainder of said time intervals; and transmitting, from said second communication device and in response to said directing step, said information signal to said base station over said one of said communication channels continuously throughout said predetermined at least one of said time intervals and RF energy over said second communication channel continuously throughout said remainder of said time intervals, whereby said interference is reduced proximate said second communication device due to continuous transmission thereby.

11. A communication device operating in time-division multiple access communication system in which a plurality of communication channels are divided into a cycle of time intervals, said communication system including a base station, said communication device for reducing amplitude modulation interference comprising:

a transmitter; and a controller for directing said transmitter to transmit an information signal to said base station over a first of said plurality of communication channels continuously throughout a predetermined at least one of said time intervals and RF energy continuously throughout a remainder of said time intervals, wherein said RF energy comprises a non-message bearing signal, whereby amplitude modulation interference is reduced proximate said communication device due to continuous transmission thereby.

12. The communication device of claim 11 wherein said controller directs said transmitter to transmit RF energy over said first communication channel continuously throughout said remainder of said time intervals.

13. The communication device of claim 11 wherein said controller directs said transmitter to transmit RF energy over a second of said plurality of communication channels continuously throughout said remainder of said of said time intervals.

14. A system for reducing amplitude modulation interference in a time-division multiple access communication system having a plurality of communication devices which communicate with a base station and in which a plurality of communication channels are time and frequency divided into a cycle of slots, said system comprising:

means for directing a first of said plurality of communication devices to transmit an information signal to said base station continuously throughout a predetermined at least one of said slots of a first of said plurality of communication channels and to transmit RF energy continuously throughout a remainder of said slots of said first communication channel, wherein said RF energy comprises a non-message bearing signal; and means, in said first communication device and responsive to said means for directing, for transmitting said information signal to said base station continuously throughout said predetermined at least one slot of said first communication channel and to transmit RF energy continuously throughout said remainder of slots of said first communication channel, whereby said interference is reduced proximate said first communication device due to continuous transmission thereby.

15. The system of claim 14 wherein said cycle of slots comprises eight slots, each of said eight slots being about 577 microseconds in duration and about 200 kilohertz in frequency bandwidth.

16. The system of claim 15 wherein said first communication channel is fixed in frequency, and a remainder of said plurality of communication channels are frequency-agile.

17. The system of claim 15 wherein each of said plurality of communication channels are frequency-agile.

18. The system of claim 14 wherein said cycle of slots comprises six slots, each of said six slots being about 3.33 milliseconds in duration and about 30 kilohertz in frequency bandwidth.

19. The system of claim 18 wherein said first communication channel is fixed in frequency.

20. The system of claim 18 wherein each of said plurality of communications channels is fixed in frequency.

21. The system of claim 14 further comprising:

means for directing a second of said plurality of communication devices to transmit an information signal to said base station continuously throughout a predetermined at least one of said slots of a second of said plurality of communication channels and to transmit RF energy over said second communication channel continuously throughout a rider of said slots of said second communication channel; and means, in said second communication device and responsive to said means for directing, for transmitting said information signal to said base station continuously throughout said predetermined at least one slot of said second communication channel and to transmit RF energy over said second communication channel continuously throughout said remainder of said slots of said second communication channel, whereby said interference is reduced proximate said second communication device due to continuous transmission thereby.

22. The system of claim 21 wherein said cycle of slots comprises eight slots, each of said eight slots being about 577 microseconds in duration and about 200 kilohertz in frequency bandwidth.

23. The system of claim 22 wherein said first and second communication channels are fixed in frequency, and a remainder of said plurality of communication channels are frequency-agile.

24. The system of claim 22 wherein each of said plurality of communication channels are frequency-agile.

25. The system of claim 21 wherein said cycle of slots comprises six slots, each of said six slots being about 3.33 milliseconds in duration and about 30 kilohertz in frequency bandwidth.

26. The system of claim 25 wherein said first and second communication channels are fixed in frequency.

27. The system of claim 25 wherein each of said plurality of communications channels is fixed in frequency.

28. A system for reducing amplitude modulation interference in a time-division multiple access communication system having a plurality of communication devices which communicate with a base station and in which a plurality of communication channels are time and frequency divided into a cycle of slots, said system comprising:

means for directing a first of said plurality of communication devices to transmit an information signal to said base station continuously throughout a predetermined at least one of said slots of a primary communication channel of said plurality of communication channels and to transmit RF energy continuously throughout a remainder of said slots of an auxiliary communication channel of said plurality of communication channels, wherein said RF energy comprises a non-message bearing signal; and means, in said first communication device and responsive to said means for directing, for transmitting said information signal to said base station continuously throughout said predetermined at least one of said slots of said primary communication channel and to transmit RF energy continuously throughout a remainder of said slots of said auxiliary communication channel, whereby said interference is reduced proximate said first communication device due to continuous transmission thereby.

29. The system of claim 28 wherein said cycle of slots comprises eight slots, each of said eight slots being about 577 microseconds in duration and about 200 kilohertz in frequency bandwidth.

30. The system of claim 29 wherein said auxiliary communication channel is fixed in frequency, and a remainder of said plurality of communication channels are frequency-agile.

31. The system of claim 29 wherein each of said plurality of communication channels are frequency-agile.

32. The system of claim 28 wherein said cycle of slots comprises six slots, each of said six slots being about 3.33 milliseconds in duration and about 30 kilohertz in frequency bandwidth.

33. The system of claim 32 wherein said auxiliary communication channel is fixed in frequency.

34. The system of claim 32 wherein each of said plurality of communications channels is fixed in frequency.

35. The system of claim 28 further comprising:
means for directing a second of said plurality of communication devices to transmit an information signal to said base station continuously throughout a predetermined at least one of said slots of one of said plurality of communication channels and to transmit RF energy continuously throughout a remainder of said slots of said auxiliary communication channel; and
means, in said second communication device and responsive to said means for directing, for transmitting said information signal to said base station continuously throughout said predetermined at least one slot of said one of said communication channels and to transmit RF energy continuously throughout said remainder of slots of said auxiliary communication channel, whereby said interference is reduced proximate said second communication device due to continuous transmission thereby.

36. The system of claim 35 wherein said cycle of slots comprises eight slots, each of said eight slots being about 577 microseconds in duration and about 200 kilohertz in frequency bandwidth.

37. The system of claim 36 wherein said auxiliary communication channel is fixed in frequency, and a remainder of said plurality of communication channels are frequency-agile.

38. The system of claim 36 wherein each of said plurality of communication channels are frequency-agile.

39. The system of claim 35 wherein said cycle of slots comprises six slots, each of said six slots being about 3.33 milliseconds in duration and about 30 kilohertz in frequency bandwidth.

40. The system of claim 39 wherein said auxiliary communication channel is fixed in frequency.

41. The system of claim 39 wherein each of said plurality of communications channels is fixed in frequency.

42. A communication device operating in a time-division multiple access communication system in which a plurality of communication channels are time and frequency divided into a cycle of slots, said communication system including a base station, said communication device for reducing amplitude modulation interference comprising:
a transmitter; and
a controller for directing said transmitter to transmit an information signal to said base station continuously throughout a predetermined at least one of said slots of a first of said plurality of communication channels and to transmit RF energy continuously throughout a remainder of said slots of said first communication channel, wherein said RF energy comprises a non-message bearing signal, whereby amplitude modulation interference is reduced proximate said communication device due to continuous transmission thereby.

43. The communication device of claim 42 wherein said cycle of slots comprises eight slots, each of said eight slots being about 577 microseconds in duration and about 200 kilohertz in frequency bandwidth.

44. The communication device of claim 43 wherein said first communication channel is fixed in frequency, and a remainder of said plurality of communication channels are frequency-agile.

45. The communication device of claim 43 wherein each of said plurality of communication channels are frequency-agile.

46. The communication device of claim 42 wherein said cycle of slots comprises six slots, each of said six slots being about 3.33 milliseconds in duration and about 30 kilohertz in frequency bandwidth.

47. The communication device of claim 46 wherein said first communication channel is fixed in frequency.

48. The communication device of claim 46 wherein each of said plurality of communications channels is fixed in frequency.

49. A communication device operating in a time-division multiple access communication system in which a plurality of communication channels are time and frequency divided into a cycle of slots, said communication system including a base station, said communication device for reducing amplitude modulation interference comprising:
a transmitter; and
a controller for directing said transmitter to transmit an information signal to said base station continuously throughout a predetermined at least one of said slots of a primary communication channel of said plurality of communication channels and to transmit RF energy continuously throughout a remainder of said slots of an auxiliary communication channel of said plurality of communication channels, wherein said RF energy comprises a non-message bearing signal, whereby amplitude modulation interference is reduced proximate said communication device due to continuous transmission thereby.

50. The communication device of claim 49 wherein said cycle of slots comprises eight slots, each of said eight slots being about 577 microseconds in duration and about 200 kilohertz in frequency bandwidth.

51. The communication device of claim 50 wherein said auxiliary communication channel is fixed in frequency, and a remainder of said plurality of communication channels are frequency-agile.

52. The communication device of claim 50 wherein each of said plurality of communication channels are frequency-agile.

53. The communication device of claim 49 wherein said cycle of slots comprises six slots, each of said six slots being about 3.33 milliseconds in duration and about 30 kilohertz in frequency bandwidth.

54. The communication device of claim 53 wherein said auxiliary communication channel is fixed in frequency.

55. The communication device of claim 53 wherein each of said plurality of communications channels is fixed in frequency.

56. A system for reducing amplitude modulation interference in a time-division multiple access communication system having a plurality of communication devices which communicate with a base station and in which a plurality of communication channels are time and frequency divided into a cycle of slots, said system comprising:

means for directing a first of said plurality of communication devices to transmit an information signal to said base station continuously throughout a predetermined at least one of said slots of a primary communication channel of said plurality of communication channels and to transmit RF energy continuously throughout a remainder of said slots of an auxiliary communication channel of said plurality of communication channels;

means, in said first communication device and responsive to said means for directing, for transmitting said information signal to said base station continuously throughout said predetermined at least one of said slots of said primary communication channel and to transmit RF energy continuously throughout a remainder of said slots of said auxiliary communication channel, wherein said RF energy comprises a non-message bearing signal, whereby said interference is reduced proximate said first communication device due to continuous transmission thereby;

means for directing a second of said plurality of communication devices to transmit an information signal to said base station continuously throughout a predetermined at least one of said slots of one of said plurality of communication channels and to transmit RF energy continuously throughout a remainder of said slots of said auxiliary communication channel such that said RF energy transmitted from said first and second communication devices share said auxiliary communication channel; and means, in said second communication device and responsive to said means for directing, for transmitting said information signal to said base station continuously throughout said predetermined at least one slot of said one of said communication channels and to transmit RF energy continuously throughout said remainder of slots of said auxiliary communication channel, whereby said interference is reduced proximate said second communication device due to continuous transmission thereby.

* * * * *